March 1, 1966  J. E. JENDRISAK  3,238,034
GLASS BENDING APPARATUS FOR FORMING CURVED GLASS PANES
HAVING CONICAL SURFACE PORTIONS
Filed July 26, 1963  3 Sheets-Sheet 1
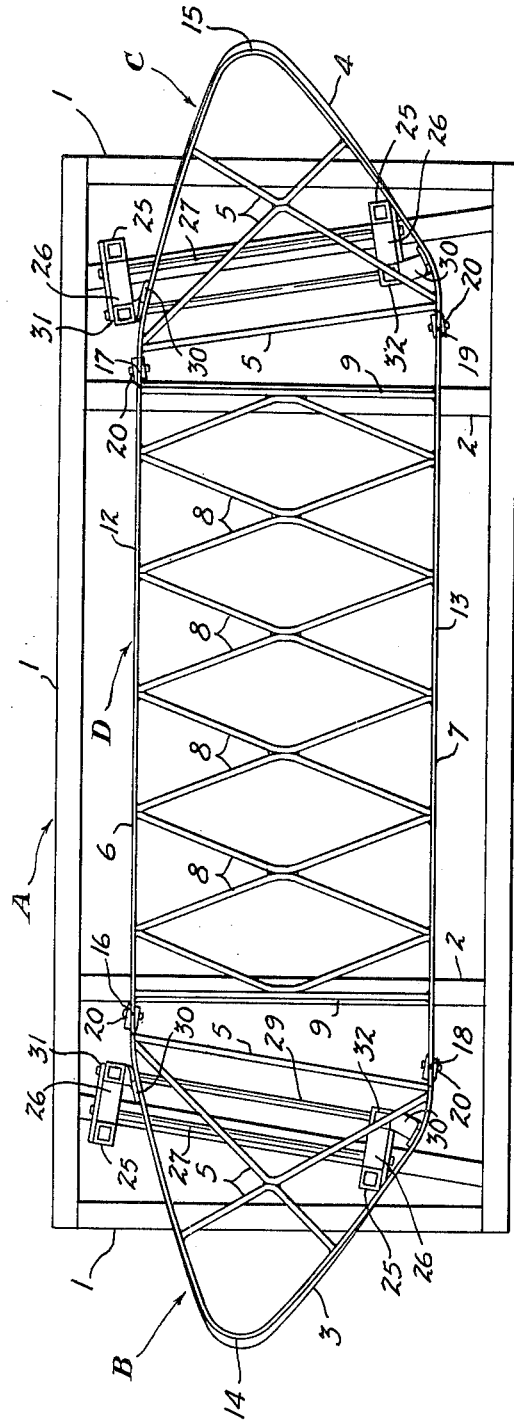
INVENTOR
Joseph E. Jendrisak
BY McCoy, Greene, Medert
+ Te Grotenhuis
ATTORNEYS March 1, 1966  J. E. JENDRISAK  3,238,034
GLASS BENDING APPARATUS FOR FORMING CURVED GLASS PANES
HAVING CONICAL SURFACE PORTIONS
Filed July 26, 1963  3 Sheets-Sheet 2
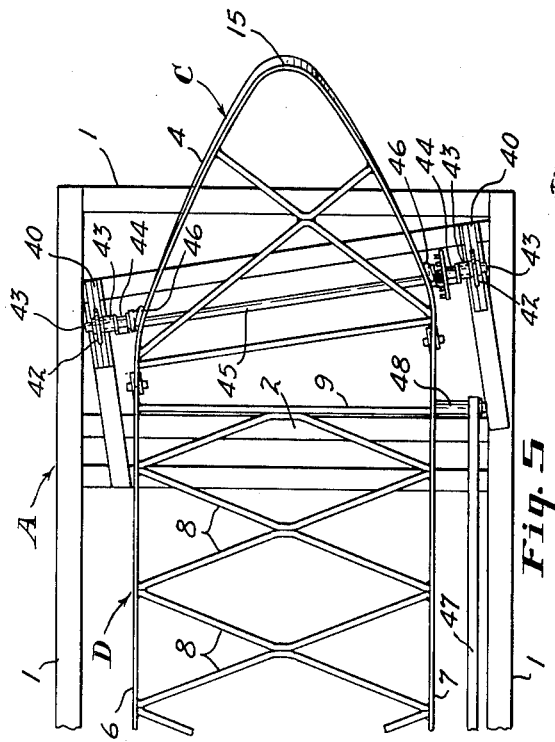
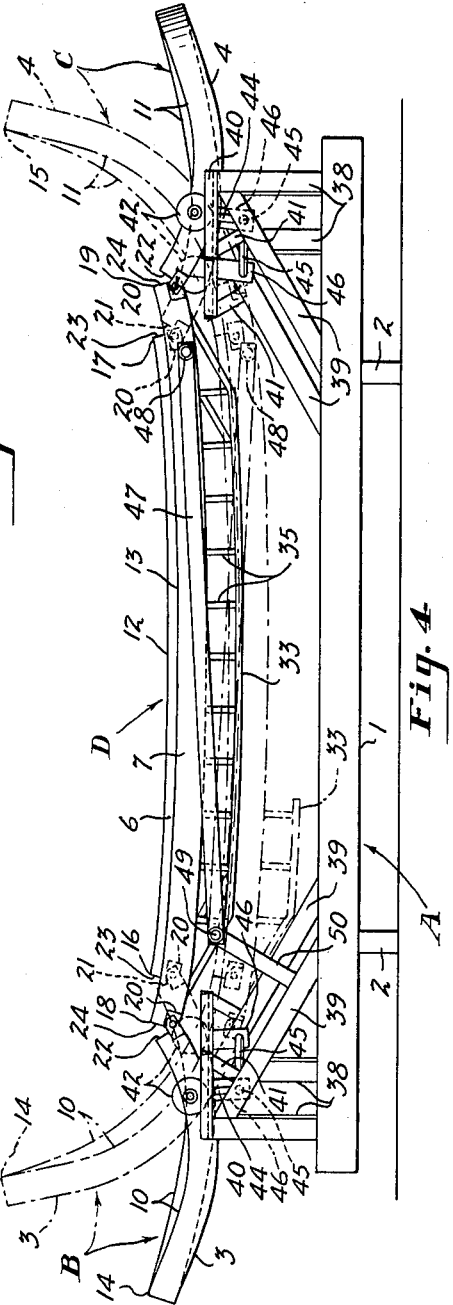
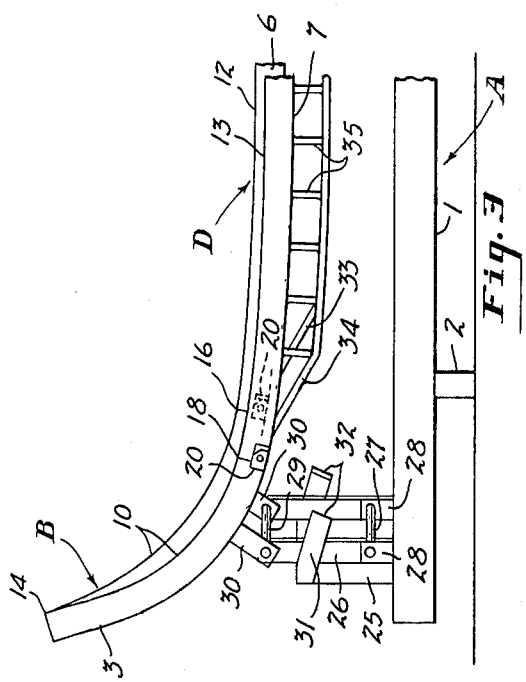
INVENTOR
Joseph E. Jendrisak
BY McCoy, Greene, Medert
 & Te Grotenhuis
ATTORNEYS March 1, 1966 J. E. JENDRISAK 3,238,034
GLASS BENDING APPARATUS FOR FORMING CURVED GLASS PANES
HAVING CONICAL SURFACE PORTIONS
Filed July 26, 1963 3 Sheets-Sheet 3

INVENTOR
Joseph E. Jendrisak
BY McCoy, Greene, Medert
& Te Grotenhuis
ATTORNEYS

United States Patent Office 3,238,034
Patented Mar. 1, 1966

3,238,034
GLASS BENDING APPARATUS FOR FORMING CURVED GLASS PANES HAVING CONICAL SURFACE PORTIONS
Joseph E. Jendrisak, Northville, Mich., assignor to Shatterproof Glass Corporation, Detroit, Mich., a corporation of Delaware
Filed July 26, 1963, Ser. No. 297,849
The portion of the term of the patent subsequent to June 15, 1982, has been disclaimed
2 Claims. (Cl. 65—290)

This application is a continuation-in-part of application Serial No. 18,288 filed March 29, 1960 and of application Serial No. 753,500 filed August 6, 1958 now Patent No. 3,103,430.

The present invention relates to the gravity bending of heat softened glass sheets and more particularly to apparatus for shaping or molding curved glass panes having sharply bent portions that are of generally conical form.

In the manufacture of curved motor vehicle windshields and the like, it is common practice to form the curved glass panes by heat softening the glass and causing it to sag into a mold having the desired contour, as disclosed in Patent No. 2,872,756 granted to me February 10, 1959, or in my co-pending applications Serial No. 753,500 filed August 6, 1958, and Serial No. 18,288 filed March 29, 1960.

In an apparatus of the collapsible type used for gravity bending, a flat pane of glass is first loaded on a bending mold which is pivoted to an open or glass receiving position. In this position the glass sheet is supported by the outer ends of the mold and at intermediate points along the margin of the glass sheet.

The front window of a motor vehicle in which the windshield is mounted extends across the front end of the vehicle body and back a short distance along the opposite sides of the body. The bottom of the opening which is located adjacent the top of the instrument panel extends horizontally across the front and back a short distance along the side edges. Across the front the bottom edge of the opening is only slightly curved and may be said to be substantially straight throughout the major portion of its length and at the ends is curved rearwardly. The ends of the windshield opening extend substantially vertically to adjacent the top of the body. The top edge of the opening extends horizontally across the front of the vehicle body, and for the major portion of its length is substantially straight and approximately parallel to the straight portion of the bottom edge of the opening. The straight portion of the top of the opening is usually longer than the straight portion of the bottom of the opening for the reason that the forward end of the vehicle body above the hood tapers forwardly and slants rearwardly, so that the straight portion of the top of the opening lies in a wider portion of the body. To fit in an opening of this character it is necessary that the windshield be bent in such manner that it will conform to the opening. The exterior of the windshield is of convex horizontal curvature from top to bottom and usually of slightly convex curvature in vertical sections. In some portions of the windshield the vertical or horizontal sections may be very nearly straight but any reverse bends which would tend to provide concave portions in the front surface are undesirable.

Most windshields have a rearward slant from the bottom to the top but the degree of slant varies considerably, being usually less in busses and trucks than in automobiles. In automobiles, the windshields are generally made in one piece with identical bent back portions at opposite ends. In trucks and busses, it is common practice to provide the windshield opening with a center post and to mount half windshields on opposite sides of the post. In the so-called skeleton windshield molds of the collapsible type, the marginal glass engaging members are of the same shape as the windshield opening and, in molds for bending glass precut to final shape, the narrow continuous glass engaging edges of mold members conform to the narrow glass receiving seat that extends throughout the perimeter of the windshield opening when the mold is in closed glass shaping position and the bottom face of the glass pane which is shaped by the mold is the exterior face of the windshield when mounted in the windshield opening of the motor vehicle. The edge of the mold which conforms to the bottom of the window opening has a straight portion conforming to the straight portion of the bottom edge of the window opening and an end portion that conforms to a rearwardly curved end portion of the bottom edge of the window opening.

The opposite marginal edge of the mold has a straight portion parallel to the straight portion of the opposite edge and a curved end portion which conforms to a rearwardly curved end portion of the top edge of the window opening and an end edge of the window opening. The end portions of the opposite sides of the mold are at opposite inclinations to the straight side edge portions and converge to an apex at the end of the mold. The angle of the end portions of the side edge of the mold which conforms to the bottom edge of the window opening to the straight portion of the side edge varies with the rearward slant of the windshield opening and where the rearward slant is slight, the end portion conforming to the rearwardly curved bottom edge of the window opening will extend at a small angle to the straight portion.

The shape of the end portion of the side of a mold that conforms to the top and end edges of the windshield opening is determined partly by the slant of the opening in the vehicle body and partly by the downward curvature of the opening at its ends. The end portion of the side of the mold which conforms to the top and end edges of the windshield opening joins the opposite side edge of the end portion at an apex which is usually offset with respect to the center line of the mold toward the side thereof that conforms to the bottom of the windshield opening and when the inclination of the windshield is slight the apex of the mold may be closer to the straight side edge that forms the bottom portion of the windshield than to the center line of the mold. The mold end sections in collapsible molds are hinged to the center section near the portions which form the turned back end of the windshield. Heretofore, it has been common practice to pivotally connect mold end sections to the body portion of the mold to swing about an axis at right angles to the parallel side edges of the body portion and to support the glass to be bent on the apex of the end section and on intermediate supports at opposite sides of the mold and adjacent the axis of the pivotal connection. When the apex of an end section is considerably offset from the center line of the mold, the distance from the apex of the mold to the intermediate support at the side of the mold which conforms to the bottom of the windshield opening is considerably less than the distance from the said apex to the intermediate support at the opposite side of the mold.

Inequality of the spacing of the supports for the end portion of a glass sheet being bent may result in imperfect bending due to the tendency of the portion of the glass between the apex and the intermediate support spaced farthest from it to sag faster when softened by heat than the portion lying between the more closely spaced supports during the closing of the mold. The inequality of spacing, particularly when the shape of the end of the glass sheet in such that a considerable portion of the glass sheet projects beyond the line connecting the apex of the section to the intermediate support farthest from it, may cause warping or creasing of the glass along the line of bend which results in a wavy distortion of the glass surface due to reverse bending prior to full engagement of the glass with the mold.

The curved bend at the end of the windshield is disposed outwardly of the straight bottom and top edge portions of the windshield opening and it is desirable that the windshield have an arcuate corner bend that extends generally parallel to a line connecting the end of the straight portion of the bottom of the opening to the end of the straight portion at the top of the windshield opening. Windshields usually have vertical convexity and, when mounted in a rearwardly slanted position the angle of slant increases toward the top edge thereof. The tapering ends of the forward end of the vehicle body are at obtuse angles to the front face and, because of the increased slant of the windshield, the angle measured in horizontal planes increases toward the top of the windshield. For this reason, it is usually desirable to vary the curvature of the corner bend from the top to the bottom of the windshield, in which case the bend may have a generally conical contour. Regardless of the extent of variation in curvature, the bend should conform in a general way to an arc of a surface of revolution, and the center line of this arc may be referred to as the line of bend which will be disposed approximately parallel or at a slight angle to the line connecting the ends of the straight top and bottom portions of the windshield opening. It has been found that much more uniform bending of the curved end portions of windshields may be obtained by pivoting the end sections to swing about axes that are disposed substantially parallel to the line of bend and this may be accomplished by connecting the end section to the straight side members of the body portion of a half windshield mold by means of coaxial pivots that are adjacent the ends of the straight side members and parallel or nearly parallel to the line of bend or by similarly connecting each of the end sections to the center section of a full windshield mold.

Each mold end section is supported for bodily movement in a direction at right angles to the axis of the pivots connecting it to the body portion or center section of the mold while the endwise movement of the body portion or central section is restricted. In molds as heretofore constructed, the pivots connecting the end section to the center section or body portion have been disposed at right angles to the longitudinal axis of the mold and the end section has had endwise movement in the direction of the longitudinal axis of the mold. According to the present invention however, the axes of the pivots connecting the end sections to the body or center section are disposed at an acute angle to the longitudinal axis of the mold and the end sections are mounted for movement at right angles to said pivotal axis so that the mold is required to have a combined longitudinal and lateral movement during its movement from its glass receiving position to its molding position. In full windshield molds the ends of the mold are moved simultaneously and equally in the same lateral direction during the bending operation. In the case of a half windshield, means is provided for so supporting the end of the mold opposite to that having the pivoted and curved end section as to accommodate the lateral movement of the mold during bending operation.

The present invention has for its object to provide improved means for forming curved glass full or half windshields which have bends disposed at an acute angle to the longitudinal center line thereof.

It is a further object of the invention to provide an improved windshield mold for bending full windshields having end portions that are bent along lines having opposite angularity with respect to the longitudinal center line of the glass pane.

Reference should be had to the accompanying drawings forming a part of this specification in which:

FIGURE 1 is a plan view of a glass bending apparatus embodying the present invention in the form of a collapsible mold and supporting frame;

FIGURE 2 is a side elevation of the collapsible mold and frame shown in FIGURE 1, showing the mold in open or glass receiving position in solid lines and in closed or molding position in dot-dash lines;

FIGURE 3 is a fragmentary side elevation of one end of the collapsible mold and frame shown in FIGURE 2 showing the mold in its closed or molding position;

FIGURE 4 is a side elevation of a modified form of a collapsible mold and supporting frame embodying the invention that shows the mold in its open or glass receiving position in solid lines and in its closed or molding position in dot-dash lines;

FIGURE 5 is a fragmentary top elevation of one end of the collapsible mold and frame shown in FIGURE 4;

Figure 6:
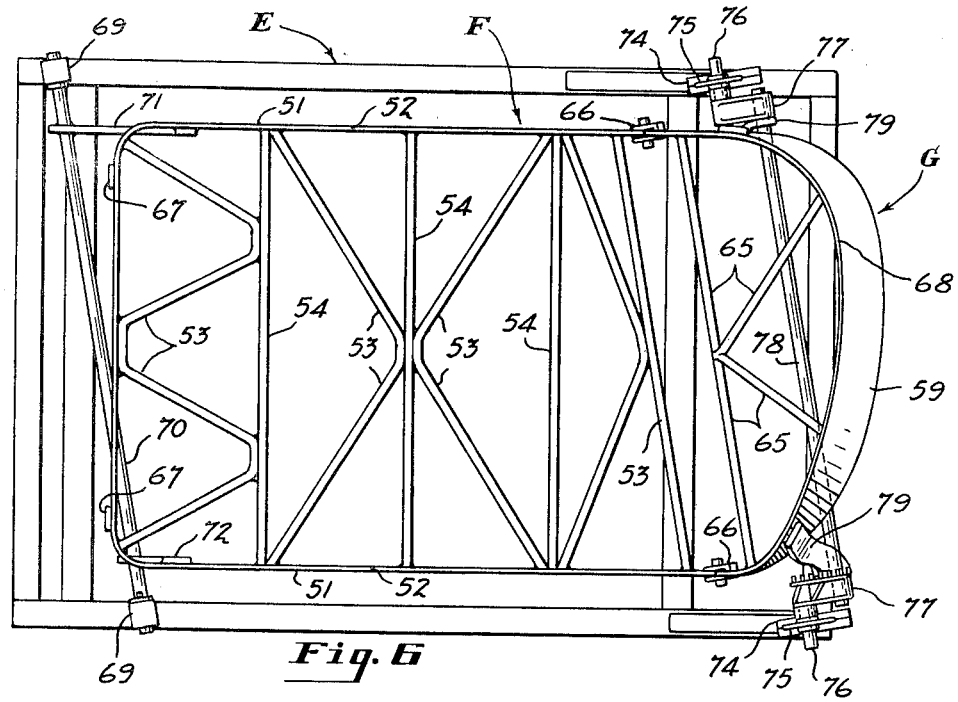
FIGURE 6 is a plan view of a half windshield glass bending apparatus embodying the present invention in the form of a collapsible two section mold and supporting frame.

Referring to the drawings, FIGURES 1, 2 and 3 show a glass bending apparatus embodying the present invention which comprises a supporting frame A and a collapsible glass shaping mold composed of two end sections B and C that are rockably supported on the frame A and a center section D that is interposed between the end sections B and C and pivotally supported on the inner ends of the end sections B and C.

As shown in FIGURES 1, 2 and 3, the frame A comprises a rectangular base 1 mounted on runners 2 which serve to support the frame on a conveyor such as a bed of live rollers for advancing the molds through controlled heating zones of an oven. The base 1 and runners 2 are preferably tubular metal members which have adequate structural strength but are of light weight and low heat absorbing capacity.

The end sections B and C of the mold are formed of thin steel rails 3 and 4 disposed on edge and forming the margin of the mold end sections, the rails 3 and 4 being reinforced by cross members 5 that connect the side portions of the rails 3 and 4 below the top edge thereof. The glass engaging rails 3 and 4 are of light weight so that they do not materially retard the cooling of the glass after the bending operation and are preferably imperforate so that the transfer of heat between the glass and the rails 3 and 4 is uniform at all points of contact.

The center section D is formed by two thin steel side rails 6 and 7 that are disposed on edge and connected adjacent their ends by cross members 9 and intermediate their ends by diagonal members 8. In order to provide maximum rigidity with minimum weight, the bracing members 5, 8 and 9 are preferably in the form of relatively thin walled metal tubes.

When the mold is in its closed or molding position, the rails 3, 4, 6 and 7 form a substantially continuous and concave glass shaping template having top faces 10, 11, 12 and 13 which define a curved surface for forming heat softened glass sheets into curved panes of glass having sharply bent portions adjacent the ends thereof, suitable for automobile windshields.

The mold sections B, C and D are so constructed that the end edges of the molding rails 6 and 7 of the center section D are located at points which lie in the same plane so that when the mold is in the open or glass receiving position as shown in solid lines in FIGURE 2, a sheet of glass positioned on the mold will be supported at the apices, 14 and 15, of the end sections B and C and on the upwardly extending end edges 16, 17, 18 and 19 of the center section D as shown in solid lines in FIGURE 2.

The end sections B and C are connected to the center section D by two identical hinge connections 20 between the ends 21 and 22 of the marginal rails 3 and 4 of sections B and C and of the ends 23 and 24 of the side rails 6 and 7 of the center section D as best shown in FIGURE 2. The hinges 20 may be of the type disclosed in my co-pending U.S. patent application Serial No. 753,500 above referred to.

Located on the frame A are short posts 25 attached to the base 1 and arranged in pairs at opposite ends of the frame to support the mold. A pair of supporting links 26 are positioned inwardly of each pair of posts 25 at the lower ends and are attached to a horizontal shaft 27 journaled in bearing brackets 28 attached to the frame at the inner side of the posts 25 of each pair closely adjacent the top of the base 1. The upper ends of the supporting links 26 of each pair receive a horizontal shaft 29 which is attached at its ends to brackets 30 rigidly secured to and extending downwardly from the rails 3 and 4 of the end sections of the mold. The supporting links 26 are disposed vertically and engage the inner faces of the posts 25 when the mold sections B, C and D are in molding position as shown in dot-dash lines in FIGURE 2, and in full lines in FIGURE 3, and the links 26 swing inwardly and downwardly as the center section D is moved upwardly to the glass receiving position shown in solid lines in FIGURE 2. The posts 25 limit movement of the links 26 in one direction and straps 31 attached to the posts 25 are provided with stop flanges 32 in the path of the links to limit their movement in the opposite direction. The links 26 engage the stop flanges 32 when the mold is in glass receiving position and the posts 25 when the mold is in molding position.

The center section D is preferably provided with truss-like reinforcing means in the form of tension chords 33 and 34 attached to the lower edges of the rails 6 and 7 adjacent their ends, and connected to the rails 6 and 7 intermediate their ends by short connecting bracers 35.

When the superposed flat rigid panes of glass 36 and 37 are placed on the ends 14 and 15 of the end sections B and C, the end sections act as levers pivoting on the shafts 29 at the upper end of the links 26 and exerting an upward thrust on the center section D to lift the same until its movement is arrested by engagement with the glass, after which the weight of the glass is carried by the apices 14 and 15 of the end sections B and C and by the end edges 16, 17, 18 and 19 of the center section D in proportions determined by the weight of the center section D and the position of the shafts 27 and 29 with respect to the end sections.

The side rails 6 and 7 of the center section D are substantially parallel and of different lengths, the rails 7 which conform to the straight portion of the top edge of the windshield being longer than the rails 6 which conform to the bottom edge of the windshield. The hinges 20 which connect the ends of the rails 6 and 7 to the rails 3 and 4 of the end sections are disposed at an acute angle to the longitudinal center line of the mold, the pivots connecting each end section to the center section being coaxial and the axes to the hinges 20 at the opposite ends of the center section having equal and opposite angularity with respect to the rails 6 and 7.

The shafts 27 and 29 are each parallel to the axes of the hinges 20 connecting the end sections B and C to the center section D, which are substantially parallel to a line connecting the centers of the arcuate bends in the portions of each of the rails 3 and 4 which lie on opposite sides of the end sections B and C. When the curvature of the shaping surface at one side of an end section is greater than at the other, the glass when supported as herein disclosed, will be bent to a gradually increasing curvature from the side portion of the end section having the lesser curvature to the side portion of greater curvature.

FIGURES 4 and 5 show a modified form of glass bending mold wherein the mold sections have roller supports similar to those shown in my co-pending application Serial No. 18,288 above referred to. The mold end and center sections B, C and D may be of the same construction as those shown in FIGURES 1, 2 and 3, and corresponding parts in FIGURES 4 and 5 are indicated by like numerals.

The frame A has four vertical posts 38 of equal height attached to the base 1, each post 38 being provided with a brace 39 extending from near the top thereof that extends downwardly therefrom at an inclination to the base 1. Attached to the top of each post is a horizontal V-shaped track or way 40 that extends inwardly from the post and that is supported adjacent its inner end by a short strap 41 extending upwardly from the brace 39. Each horizontal track 40 receives a mold supporting wheel or roller 42 that is provided with a chamfered periphery that conforms to the narrow rounded bottom of the V-shaped track or way 40. Each wheel 42 is rotatably mounted on a short horizontal shaft 43 fixed to a crank arm 44 positioned outwardly of the marginal glass engaging portion of the mold, a spacer sleeve being provided on each of the shafts 43 to restrict lateral movements of the mold with respect to the wheels 42.

Each end section is supported by a pair of crank arms 44 that receive a transverse shaft 45 that is fixed in brackets 46, one pair of brackets 46 being fixed to opposite side portions of the rail 3 of end section B and the other pair being fixed to the opposite side portions of the rail 4 of the end section C. The brackets 46 extend downwardly from the rails 3 and 4 and the crank arms 44 extend upwardly from the shafts 45. The crank arms 44 are secured in fixed position with respect to the end sections B and C which are supported by the wheels 42 for free horizontal movements on the frame and for rocking movements about the axes of the shafts 45. The axes of the shafts 45 are parallel to the corresponding hinge axes of the hinges connecting the end sections B and C to the center section D as in the molding apparatus shown in FIGURES 1 through 3. The axes of the shafts 43 are coplanar and converging with respect to one another, being disposed at equal and opposite angles with respect to the side rails 6 and 7.

The crank arms 44 extend upwardly from the shafts 45 so that the axes of the shafts 45 are positioned near the top edges of the rails 3 and 4. By so positioning the shafts 45, a more uniform counterbalancing action throughout the movement of the sections from the glass receiving to the molding position is obtained for the reason that portions of the end sections below the pivotal axis about which the section swing move outwardly and increase the weight, acting to counterbalance the center section as the centers of gravity of the end sections are shifted inwardly toward the pivotal axis because of the upward swing of the outer portions of the end sections during the closing movements of the mold.

In order to provide longitudinal stability for the mold and to prevent the rollers 42 from rolling out of the troughs 38, a pivotally mounted longitudinal stabilizing bar 47 is provided, connecting the center section D to the frame A. The bar 47 is pivotally connected at one end to a shaft 48 extending outwardly from and welded to the center section molding rail 7, and at its other end to a shaft 49 mounted on a bracket 50 attached to a brace 39. The stabilizing bar is loosely mounted and due to its relatively great length, moves only through a small angle during the bending operation to provide a convenient means for constraining the center section to substantially vertical movement.

Figure 7:
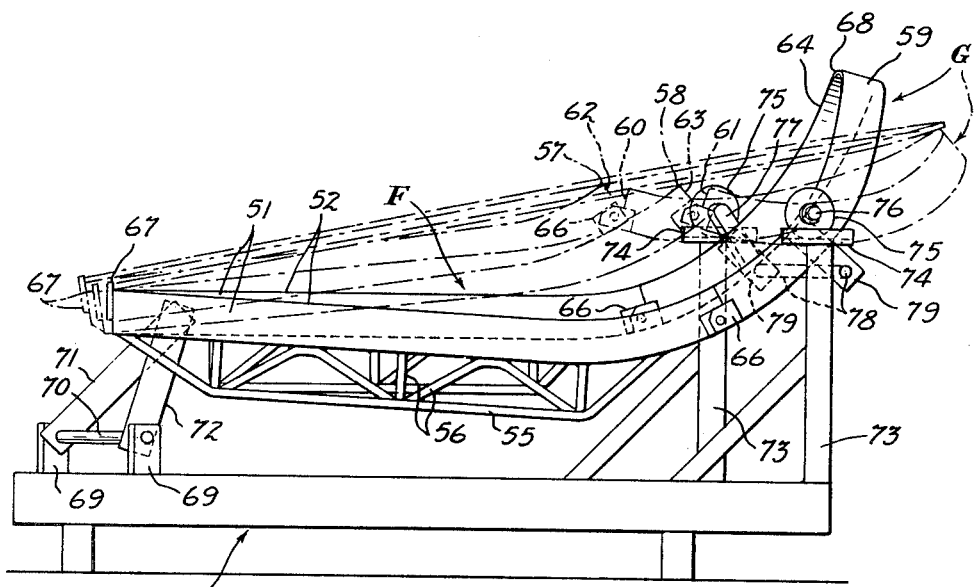
FIGURE 7 is a side elevation of the collapsible mold and frame shown in FIGURE 6 showing the mold in its closed or molding position in solid lines, and in its open or glass receiving position in dot-dash lines.

FIGURES 6 and 7 show a related embodiment of the invention which is adapted for gravity bending heat softened glass sheets to form curved half windshields for larger motor vehicles such as busses and trucks. Since bus and truck windshields are of greater height and have less slant than the usual types of automobile windshields, the high point at the end of the mold end section upon which the flat glass sheets are supported is offset from the center line of the mold toward the side thereof which shapes the bottom edge of the windshield to a greater extent than in the molds for shaping automobile windshields and the location of the axis of the hinges connecting the end section to the body of the mold parallel to or nearly parallel to the line of bend is even more important than in the three section molds for automobile windshields.

The half windshield mold comprises a supporting frame E, a main section or body portion F, and an end section G, said body portion and end section being hinged together to move from an open glass receiving position to a closed molding position where the glass shaping surface conforms to the desired contour of the marginal portion of the finished windshield. The main section F corresponds to one-half of the center section D of the full windshield molds previously described and the end section G to one of the end sections B and C of the full windshield mold, the sections F and G being hinged together inwardly of and adjacent the portion of the mold that has the greatest curvature.

The main section F has a marginal U shaped rail 51 in the form of a flat steel bar that provides a narrow top edge 52 for engagement with the glass along opposite side edges and at the end that seats on the center post of the windshield opening. The rail 51 is braced by diagonal and perpendicular cross braces 53 and 54 that are welded or otherwise suitably secured to the rail near its bottom edge. The parallel legs of the U shaped rail 51 that form the parallel side members of the mold are preferably provided with truss-like reinforcing means in the form of tension chords 55 attached to the lower edges of the rail 51 adjacent its ends and connected to the rail 51 intermediate its ends by short connecting braces 56.

The end section G has a marginal rail 59 having ends 60 and 61 which abut the free ends 62 and 63 of the rail 51 of the main section F when the mold is closed, the rail 59 having a top glass engaging face 64 which, with the top edge 52 of the rail 51 forms a substantially continuous and concave glass shaping template. The template in the half windshield mold conforms to the contour of the half windshield throughout its margin and the end section is curved to conform to the marginal portions of the windshield that engage the rearwardly curved portions of the seat for the windshield that extends through the perimeter of the windshield receiving opening in the vehicle body.

Diagonal cross braces 65 are welded or otherwise suitably secured to the lower edges of the rail 59 as shown in FIGURE 6. The ends of the rail 59 are connected to the rail 51 of the main section by hinges 66 which may be identical with the hinges 20 of the full windshield bending molds previously described. In open or glass receiving position the mold is arranged to receive a flat glass sheet supported in an inclined position on the mold as shown in dot-dash lines in FIGURE 7. The lower end of the glass engages stops 67 positioned at the outer end of the main section or body portion F of the mold and the glass is supported intermediate its ends by the upwardly extending inner end edges 57 and 58 of the main section F and the apex 68 of the end section G.

When the glass is heat softened the sections F and G collapse with the sagging glass supported thereon to the closed or molding position shown in solid lines in FIGURE 7. The hinges 66 are offset with respect to the end faces of the rails 51 and 59 that abut when the mold is closed so that the end edges 57 and 58 of the glass engaging face 52 of the center section rail 51 adjacent each hinge 66 remain above the ends of the glass engaging face 64 of the end section during the movement of the mold from its open glass receiving position to its closed position.

The two mold sections are both mounted for rocking movement on the supporting frame E. The main section F is supported on bearing brackets 69 carried by the frame E positioned beneath the ends thereof remote from the pivotal connection between the section by means of a horizontal shaft 70 connecting the brackets 69 to arms 71 and 72 fixed to the rail 51 and extending downwardly therefrom.

The end section G is supported for rocking and longitudinal movements on the frame in the same manner as the end sections of the full windshield mold shown in FIGURES 4 and 5. The frame E has posts 73 that support horizontal V-shaped tracks or ways 74 on opposite sides of the section G and the section G is supported for longitudinal movement with respect to the frame E and for vertical swinging movements about the axis of a pair of coaxial rollers 75 that travel on the ways 74. The rollers 75 are rotatably mounted on coaxial shafts 76 fixed to crank arms 77 fixed to and extending upwardly from a transverse shaft 78 journaled in brackets 79 attached to the rail 59 adjacent its pivotal connections to the rail 59. The axis of the rollers 75 is necessarily parallel to the shaft 70 and to the hinge axis formed by the hinge connection of the main section F to the end section G in order to permit movement of the mold from its glass receiving position to its closed position.

In molds for large bus or truck half windshields the opposite side portions of the marginal shaping surface which conform to the sharp bend in the windshield are often offset longitudinally a substantial distance with respect to one another and the curvature of the two bend-forming portions may vary considerably. In order to cause the glass to be bent along a transverse line connecting the shaping portions of greatest curvature, which is at an acute angle to the longitudinal center line of the mold, and to provide a uniform bend with a curvature progressively increasing from the shaping portion of lesser curvature to the shaping portion of greater curvature, the axis of the hinges 66, the axis of the supporting rollers 76, and the axis of the shaft 70 are parallel to one another, the hinge axis is adjacent the bend, the intermediate supports 57 and 58 are closely adjacent the hinge axis, and the ways 74 extend in a direction at right angles to the axes of the hinges and rollers.

By so supporting the glass sheet, the glass is held close to the portions of the marginal shaping surface having the greatest curvature while the mold is moving from the glass receiving position shown in the dash-dot lines in FIGURE 7 to the closed position shown in full lines; reverse bending of any portion of the glass sheets is prevented and the portions of the glass sheet lying between the shaping portions of greatest curvature will conform to a line of bend connecting said portions of greatest curvature and have a uniform variation in curvature along the line of bend.

It is to be understood that in accordance with the provisions of the patent statutes, variations and modifications of the specific devices herein shown and described may be made without departing from the spirit of the invention.

Having thus described my invention, what I claim is:

1. Apparatus for gravity bending heat softened glass sheets to form elongated panes that have curved bends adjacent their ends that extend transversely across them along lines having opposite angularity with respect to their longitudinal center lines comprising a mold having a center section and vertically swinging end sections that are movable from a glass receiving position to the molding position, said sections having glass engaging members provided with glass shaping faces that form a continuous marginal shaping surface when said sections are in their molding positions, said glass engaging members providing supports for a sheet during the bending that are located at the outer ends of the end sections and at opposite sides of the center section adjacent its ends, each of said end sections having curved bend shaping portions at its opposite side and adjacent its inner end that conform to a surface having a curved bend extending across the space between said shaping portions along a line of bend disposed at an acute angle to the longitudinal center line of the mold, a movable support for each end section, means pivotally connecting each end section to its support for swinging movements about a substantially horizontal axis intermediate the ends of the end section that is substantially parallel to the line of the curved bend to which said curved bend shaping surfaces of the end section conform, hinge means supporting the center section on the inner ends of the end sections and connecting each end section to an end of the center section to swing about an axis parallel to the axis of the pivotal connection between the end section and its support, and means constraining each of said movable supports to movements in a direction at right angles to the axis of its pivotal connection to its end section whereby the mold moves sidewise during its closing movements.

2. Apparatus for gravity bending heat softened glass sheets to form panes having a curved end adjacent one end which defines a generally conical surface, comprising a mold having a main section mounted for pivotal movement at one end about a stationary axis and having a vertically swinging end section hinged to the free end of said main section, said mold being movable between an open glass receiving position and a closed molding position, said sections having glass engaging faces that form a continuous marginal shaping surface when said sections are in their molding positions, said faces providing supports for a sheet during the bending, said end section having a curved, bend-shaping portion at its hinged inner end that conforms to a generally conical surface, rollers mounted on said end section and adapted for free linear travel, said end section being rockably supported by said rollers for pivotal movement about a transverse axis intermediate the ends of said end section, said transverse axis being parallel to said stationary axis, hinge means connecting said end section to said main section, said hinge means providing a hinge axis which lies substantially on a mid-line of generation of said conical surface, said hinge axis being parallel to said stationary axis.

References Cited by the Examiner
UNITED STATES PATENTS

| | | |
|---|---|---|
| 2,736,140 | 2/1956 | Black. |
| 2,920,423 | 1/1960 | Carson _____ 65—290 |
| 3,088,300 | 5/1963 | Elliot _____ 65—107 X |

DONALL H. SYLVESTER, *Primary Examiner*.